Nov. 10, 1942.  P. P. KRUG  2,301,416
BEER DISPENSER
Filed Oct. 5, 1940
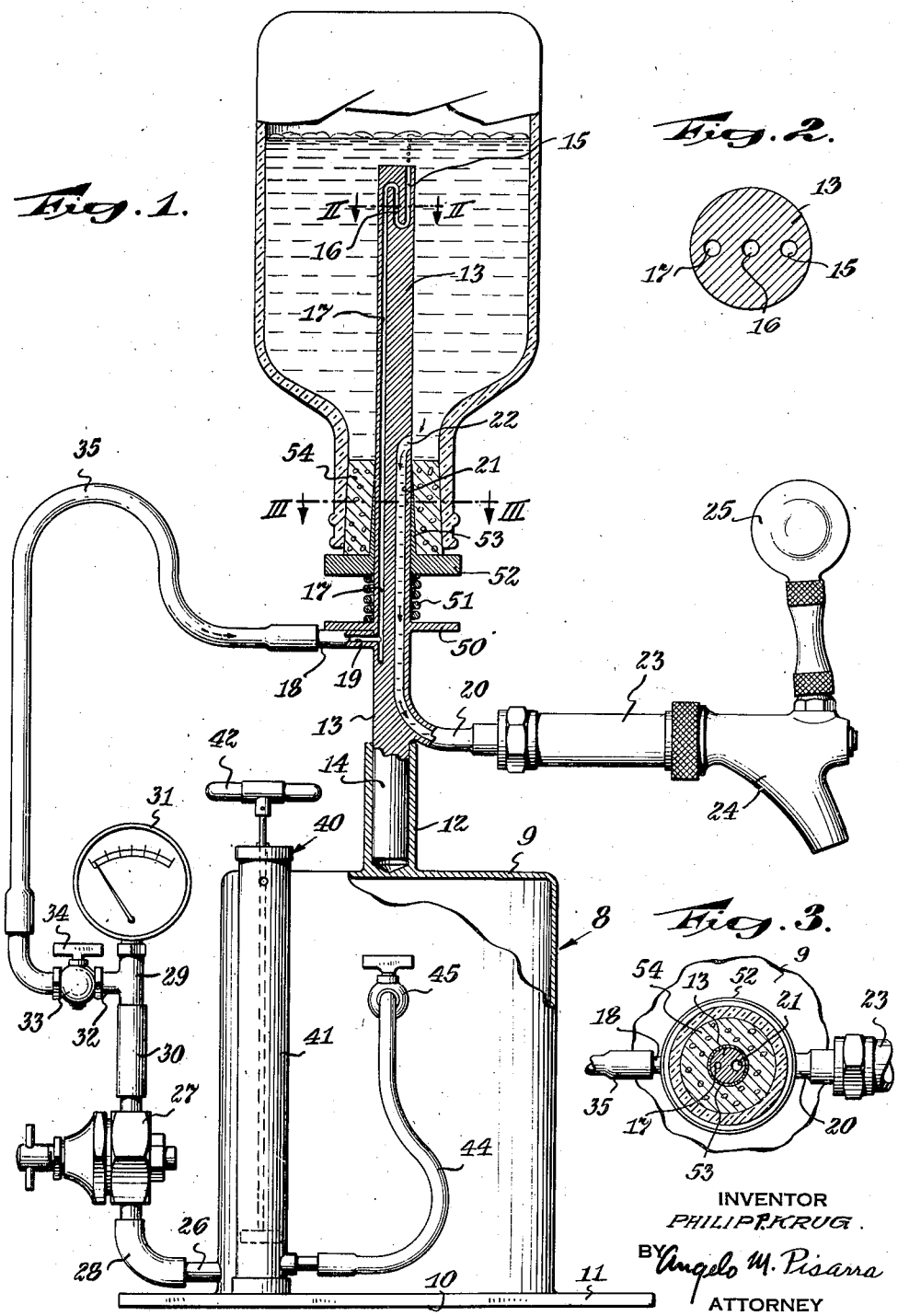
INVENTOR
PHILIP P. KRUG.
BY Angelo M. Pisarra
ATTORNEY Patented Nov. 10, 1942

2,301,416

UNITED STATES PATENT OFFICE 2,301,416

BEER DISPENSER

Philip P. Krug, Harrison, N. J.

Application October 5, 1940, Serial No. 359,849

2 Claims. (Cl. 225—18)

This invention relates to a dispensing device. In its more specific aspect the invention is directed to a portable dispensing device which is compact, light in weight, foolproof in operation and may be readily moved from place to place with a minimum of effort and without danger of dislocation of parts. These and other advantageous characteristics of the invention are readily understood from the following specification and appended drawing, wherein:

Figure 1 represents a view partially in side elevation and partially in section of a dispensing apparatus embodying the invention and shows a container of beer assembled therewith.

Figure 2 is a cross-sectional view taken on line II—II of Figure 1 in the direction of the arrows.

Figure 3 is a cross-sectional view taken on line III—III of Figure 1 in the direction of the arrows.

As shown in the drawing the dispensing apparatus comprises a small gas pressure tank 8 having a top wall 9 and base 10 extending beyond the side walls thereof to provide a supporting flange 11. Integral with said top wall 9 and extending upwardly therefrom at about the mid-part thereof is a hollow retainer cylinder 12. A solid cylinder 13 has its lower end 14 located in said retainer 12, is supported thereby, may be readily assembled therewith and may be readily demounted therefrom by merely pulling the portion 14 out of the retainer 12.

Said solid cylinder 13 has a small cylindrical opening 15 therein extending downwardly a short distance from the upper free end of said cylinder 13, then around and upwardly towards but not to the extremity of cylinder 13, as shown at 16, then around and downwardly a relatively long distance to a point about three-quarters of the length of cylinder 13, as shown at 17. Integral with the cylinder 13 and extending outwardly therefrom is a short hollow cylinder 18, whose cylindrical opening 19 communicates with opening 17 at a place a short distance above the lower extremity thereof. Also integral with said cylinder 13 and curving outwardly therefrom is a hollow cylindrical outlet conduit 20. An opening 21 extends inwardly at 22, downwardly parallel to cylindrical opening 17 and below the extremity of opening 17 and curves outwardly to be in registry with opening of outlet conduit 20. Secured to the conduit 20 is an outlet connection 23 extending above and beyond a side wall of tank 10 and having a spigot 24 demountably secured thereto. The spigot 24 includes an actuable handle 25 adapted to be moved to open and close the spigot 24. The cylinder 13 is preferably a unitary structure which may consist of a number of parts welded or in some other manner secured together to provide said single unitary structure.

Secured to that side of the tank 10 opposite to the side thereof adjacent spigot 25 is a short hollow conduit connecting sleeve 26, and a pressure control valve 27 is connected to the sleeve 26 by conduit connector 28. A T conduit connector has one end of the cross part 29 thereof connected to the valve 27 by a conduit connector 30. The other end of the cross part 29 is connected to a pressure gage 31. The stem 32 of the T connector is connected to a valve 33 which may be opened and closed by actuating its handle 34. The valve 33 is connected to the conductor 18 by a tubing 35 which may be flexible rubber or the like as may be connectors 28 and 30.

The cylinder 41 of pump 40 extends upwardly just slightly beyond the top wall 9 and the handle 42 for actuating the piston rod thereof is located above the top wall 9 in all positions. A flexible or other type of conduit 44 through an appropriate valve 45 connects the pump 40 to the tank 8.

Integral with said cylinder 13 and immediately above conduit 18 is a supporting flange 50. Mounted on the supporting flange 50 and wrapped around cylinder 13 is a helical spring 51 resting on the flange 50. Also mounted on the cylinder 13 and supported by spring 51 is a metallic flange 52 having a cylindrical portion 53 extending upwardly therefrom. The cylindrical portion 53 is relatively thin and is tapered upwardly and inwardly to a sharp upper circular edge.

The tapered cylinder 53 extends through an opening in a cork or like stopper 54 whose bottom face rests on the upper face of flange 52.

In order that the unit may be readily transported from place to place in a compact package, portion 14 of cylinder 13 may be lifted out of the retaining socket 12 and placed alongside of the tank 8. Of course, the length of the flexible rubber tubing is such as to permit this to be done. Then when the unit has reached its place of destination, all that need be done is to re-insert the end 14 of cylinder 13 into socket 12. With the cylinder 13 in upright position a bottle of beer or the like is inverted and so positioned that the cork in the neck thereof is located on the upper extremity of cylinder 13.

Then the bottle is forced downwardly on cylinder 13 until the cork is partially pushed into the neck thereof whereupon the cork 54 together with flange 52 is pressed up into the neck of the bottle and upon the application of further pressure the cork in the bottle is forced up into the beer and the cork 54 forced up into the neck of the bottle. The bottle then together with cork 54 and flange 53 is lowered on cylinder 13 until the flange 52 rests on spring 51. Still another method may be employed to connect the bottle of beer to the dispensing apparatus. By virtue of the length and flexibility of connector 35, the entire assembly supported by socket 12 may be removed therefrom and then inverted whereupon the upper end of cylinder 13 is placed on the cork in the bottle and then forced downwardly to move the cork into the bottle and the cylinder 13 in the beer and cork 54 is forced into the neck of the bottle. Then the entire assembly together with the bottle of beer mounted thereon is brought to its original position with the bottle inverted. The valve 33 which was closed during the insertion of cylinder 13 in the bottle is now opened and the gas preferably passes through hose 35, inlet 19, opening 17 and trap 16 so that the gas pressure above the beer line in the bottle is of such a magnitude as to maintain the carbonation in the beer and prevent its becoming flat. The pressure of the gas may be ascertained from the gage 31. In the event the gage reading falls below the requisite minimum, the gas pressure in tank 3 is increased by actuating pump 40. The "live" beer may be drawn off as required by actuating handle 25. When the beer has been emptied from the bottle, said bottle may be removed from cork 54 and another full bottle of beer substituted therefor.

Although I have described my invention in some detail, it is not to be limited thereby because the same is subject to certain modifications and changes.

What is claimed is:

1. A beer dispenser for a container of beer comprising a gas pressure tank, means for delivering gas from said tank to a container of beer, a portion of said means adapted to be located in said container, an inlet in said tank for admitting gas under pressure into said tank, means for drawing beer from said container, a portion thereof adapted to be located in said container, said portions of both of said means being parts of a unitary structure, a flange mounted on said unitary structure, a stopper also mounted on said unitary structure, said unitary structure demountably supported by said tank and extending upwardly from the top thereof.

2. A beer dispenser for a container of beer, said beer dispenser comprising a gas pressure tank, a unitary assembly demountably supported by said tank and comprising a single cylindrical element and a spigot connected to said element, said element disposed in a substantially upright position when said assembly is mounted on said tank, said element having an elongated opening therein through which may pass gas under pressure, said opening extending through the upper end of said element and through one side of said element and remote from said upper end, means connecting said opening and said tank, said element having a liquid discharge opening therein communicating with said spigot, the upper end of said discharge opening extending through a side of said element and being located materially below the upper end of said first opening, and means for supporting said container in inverted position, said means located between the ends of said discharge opening and including a stopper for said container, said stopper concentrically mounted on said element.

PHILIP P. KRUG.